(12) United States Patent
Sanchez

(10) Patent No.: US 12,615,492 B2
(45) Date of Patent: Apr. 28, 2026

(54) SYSTEMS AND METHODS FOR DETERMINING AN ACTUAL DRIVER OF A VEHICLE BASED AT LEAST IN PART UPON TELEMATICS DATA

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 18/765,662

(22) Filed: Jul. 8, 2024

(65) Prior Publication Data

US 2024/0365086 A1 Oct. 31, 2024

Related U.S. Application Data

(63) Continuation of application No. 17/694,291, filed on Mar. 14, 2022, now Pat. No. 12,035,204, which is a
(Continued)

(51) Int. Cl.
*H04W 48/04* (2009.01)
*H04W 4/02* (2018.01)
(Continued)

(52) U.S. Cl.
CPC ........... *H04W 4/029* (2018.02); *H04W 4/023* (2013.01); *H04W 4/40* (2018.02)

(58) Field of Classification Search
None
See application file for complete search history.

(56) References Cited

U.S. PATENT DOCUMENTS 7,697,917 B2 4/2010 Camp, Jr. et al.
8,295,890 B2 10/2012 Mendenhall et al.
(Continued)

FOREIGN PATENT DOCUMENTS

CN 102917337 A 2/2013

OTHER PUBLICATIONS

Ahmad et al., "Driver and Passenger Identification from Smartphone Data", IEEE Transaction on Intelligent Transportation Sytems, vol. 20, No. 4, 2018, pp. 1278-1288. 2018.
(Continued)

*Primary Examiner* — Gary Lafontant
(74) *Attorney, Agent, or Firm* — BRYAN CAVE LEIGHTON PAISNER LLP

(57) ABSTRACT

A computer-implemented method to determine a device of a driver including: receiving, by a computing device and from a first user device, first telematics data; receiving, by the computing device and from a second user device, second telematics data; determining, using a trained machine learning model, patterns in the first and second telematics data; determining, using the patterns in the first and second telematics data, relative positions of the first user device and the second user device; determining a predicted position of the first user device relative to the second user device; and identifying that the first user device or the second user device is associated with the driver of a vehicle based at least in part upon the predicted position of the first user device relative to the second user device. Other embodiments are described.

20 Claims, 7 Drawing Sheets

Related U.S. Application Data continuation of application No. 16/736,032, filed on Jan. 7, 2020, now Pat. No. 11,297,465.

(51) Int. Cl.

| | |
|---|---|
| *H04W 4/029* | (2018.01) |
| *H04W 4/40* | (2018.01) |

(56) References Cited

U.S. PATENT DOCUMENTS

| | | | |
|---|---|---|---|
| 8,336,664 | B2 | 12/2012 | Wallace et al. |
| 8,750,853 | B2 | 6/2014 | Abramson et al. |
| 8,952,800 | B2 | 2/2015 | Bantz et al. |
| 9,042,872 | B1 | 5/2015 | Breed et al. |
| 9,201,932 | B2 | 12/2015 | Silver et al. |
| 9,258,409 | B1 | 2/2016 | Barfield, Jr. et al. |
| 9,453,921 | B1 | 9/2016 | Bell et al. |
| 9,477,639 | B2 | 10/2016 | Fischer et al. |
| 9,609,621 | B2 | 3/2017 | Osann, Jr. |
| 9,786,103 | B2 | 10/2017 | Menon et al. |
| 9,846,912 | B1 | 12/2017 | Slusar et al. |
| 9,900,747 | B1 | 2/2018 | Park |
| 10,057,407 | B2 | 8/2018 | Mcschooler |
| 10,134,091 | B2 | 11/2018 | Adams et al. |
| 10,158,977 | B2 | 12/2018 | Cordova et al. |
| 10,387,962 | B1 | 8/2019 | Potter et al. |
| 10,469,305 | B2 | 11/2019 | Xuan et al. |
| 10,667,088 | B2 | 5/2020 | Cordova et al. |
| 10,672,249 | B1 * | 6/2020 | Balakrishnan ......... G08B 21/18 |
| 10,759,441 | B1 | 9/2020 | Balakrishnan et al. |
| 10,771,922 | B2 | 9/2020 | Lundsgaard et al. |
| 10,814,784 | B2 | 10/2020 | Pedersen |
| 10,937,105 | B1 | 3/2021 | Slusar et al. |
| 2014/0266789 | A1 | 9/2014 | Matus |
| 2015/0120336 | A1 | 4/2015 | Grokop et al. |
| 2018/0041623 | A1 | 2/2018 | Song et al. |
| 2018/0070291 | A1 * | 3/2018 | Breaux ................. H04W 4/029 |
| 2018/0124233 | A1 | 5/2018 | Abramson et al. |
| 2018/0229654 | A1 | 8/2018 | Unver et al. |
| 2018/0348786 | A1 | 12/2018 | Yasui et al. |
| 2019/0005412 | A1 | 1/2019 | Matus et al. |
| 2019/0102840 | A1 | 4/2019 | Perl et al. |
| 2019/0141489 | A1 | 5/2019 | Abramson et al. |
| 2019/0227176 | A1 | 7/2019 | Song et al. |
| 2020/0074491 | A1 | 3/2020 | Scholl et al. |
| 2020/0223358 | A1 | 7/2020 | Cordova et al. |
| 2020/0312063 | A1 | 10/2020 | Balakrishnan et al. |
| 2020/0334924 | A1 * | 10/2020 | Wells ..................... H04L 67/04 |

OTHER PUBLICATIONS

Gong et al., "Distinguishing between a Driver and a Passenger via a Silent Smartphone", 2017 IEEE Symposium on Privacy-Aware Computing, Retrieved from IEEE Xplore. 2017.

Jian et al., "TEXIVE: Detecting drivers using personal smart phones by leveraging inertial sensors", arXiv preprint arXiv: 1307.1756 Retrieved from https://arxiv.org/pdf/1307.1756.pdf.

Johnson et al., "Smartphone localization inside a moving car for prevention of distracted driving", Vehicle System dynamics, vol. 58. 2, 2020, pp. 290-306. 2020.

Khandakar et al., "Portable System for Monitoring and Controlling Driver Behavior and the User of a Mobile Phone While Driving", Sensors, 19, 1563.

Lattanzi et al., "Improving Machine Learning Identification of Unsafe Driver Behavior by Means of Sensor Fusion", Applied Sciences, No. 18, 2020, 6417. 2020.

Papadimitriou et al., "Analysis of driver behaviour through smartphone data: The case of mobile use while driving", Safety Science, vol. 119, Nov. 2019, pp. 91-97. 2019.

Saiprasert et al., "Detection of Driving Events using Sensory Data on Smartphone", International Journal of intelligent transportation system research, vol. 15, No. 1, pp. 17-28.

Sentiance, "Applying deep learning to distinguish drivers from passengers using sensor data", Sep. 2017, Retrieved from https://www.sentiance.com/2017/09/25/passenger-and-driver/. 2017.

Spruyt et al., "Driving Behavior modeling using smart phone sensor data", Feb. 26, 2021, Retrieved from https://www.sentiance.com/2016/02/11/driving-behavior/. 2021.

Thomas, "Classifying a User as Driver or Passenger in a Vehicle Using Machine Learning", Technical Disclosure Commons, Dec. 14, 2017, Publication No. IPCOM000252348D, pp. 1-35, Retrieved from https://priorart.ip.com/IPCOM/000252348. 2017.

Torres et al., "A Machine Learning Approach to Distinguish Passengers and Drivers Reading While Driving", Sensors, vol. 19, No. 14, 2019, 1-29. 2019.

Wahlstrom et al., "Driving behavior analysis for smartphone-based insurance telematics", In proceedings of the 2nd workshop on Workshop on Physical Analytics, 2015, pp. 19-24, Retrieved from https://dl.acm.org/doi/pdf/10.1145/2753497.2753535. 2015.

* cited by examiner

300

301

317

STORAGE
DEVICE

STORAGE
INTERFACE

320

330  332  334

PROCESSOR

305

MEMORY

310

COMM.
INTERFACE

315

TO/
FROM
REMOTE
DEVICE

Figure 4:
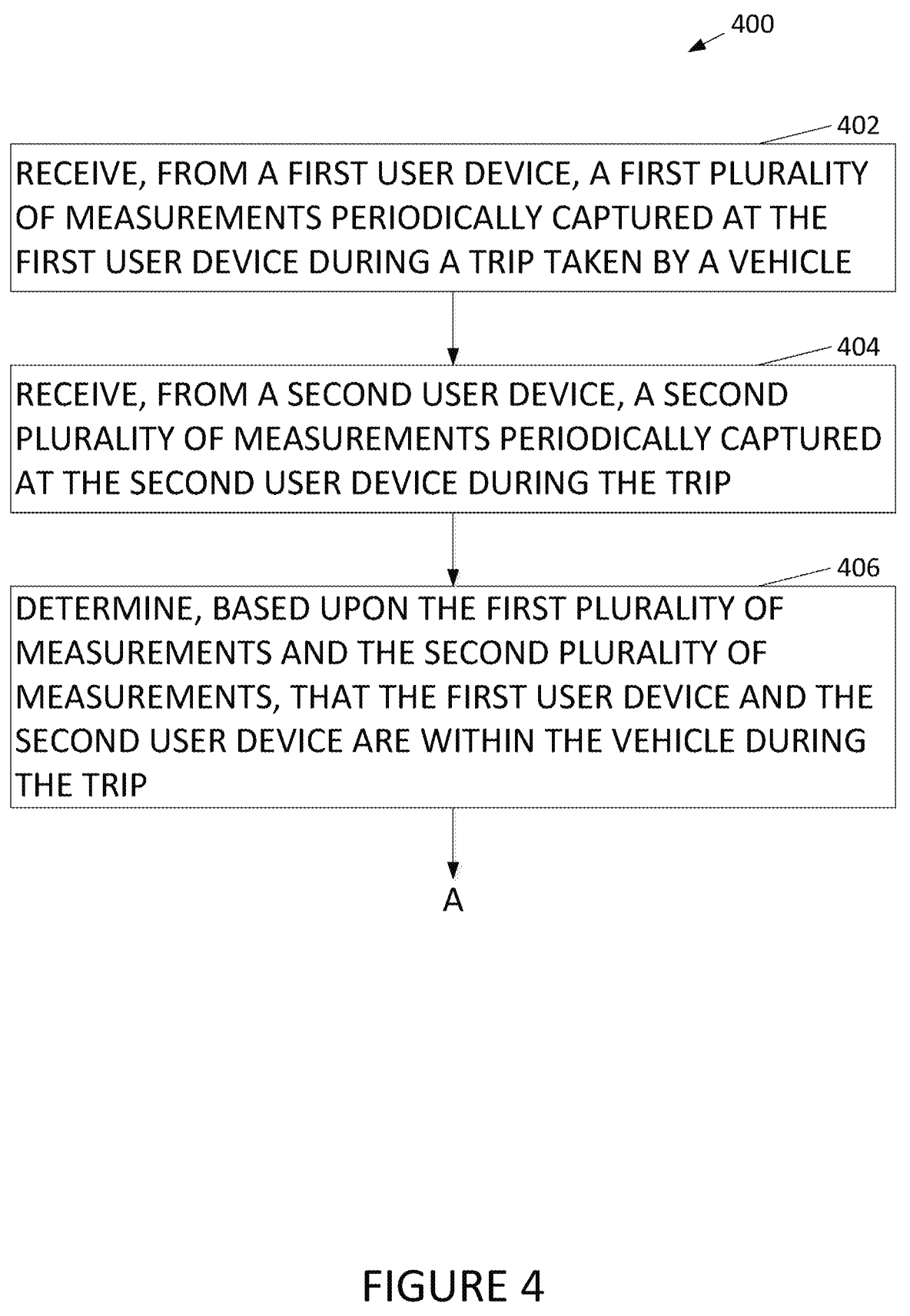

400

402

RECEIVE, FROM A FIRST USER DEVICE, A FIRST PLURALITY OF MEASUREMENTS PERIODICALLY CAPTURED AT THE FIRST USER DEVICE DURING A TRIP TAKEN BY A VEHICLE

404

RECEIVE, FROM A SECOND USER DEVICE, A SECOND PLURALITY OF MEASUREMENTS PERIODICALLY CAPTURED AT THE SECOND USER DEVICE DURING THE TRIP

406

DETERMINE, BASED UPON THE FIRST PLURALITY OF MEASUREMENTS AND THE SECOND PLURALITY OF MEASUREMENTS, THAT THE FIRST USER DEVICE AND THE SECOND USER DEVICE ARE WITHIN THE VEHICLE DURING THE TRIP

Figure 5:
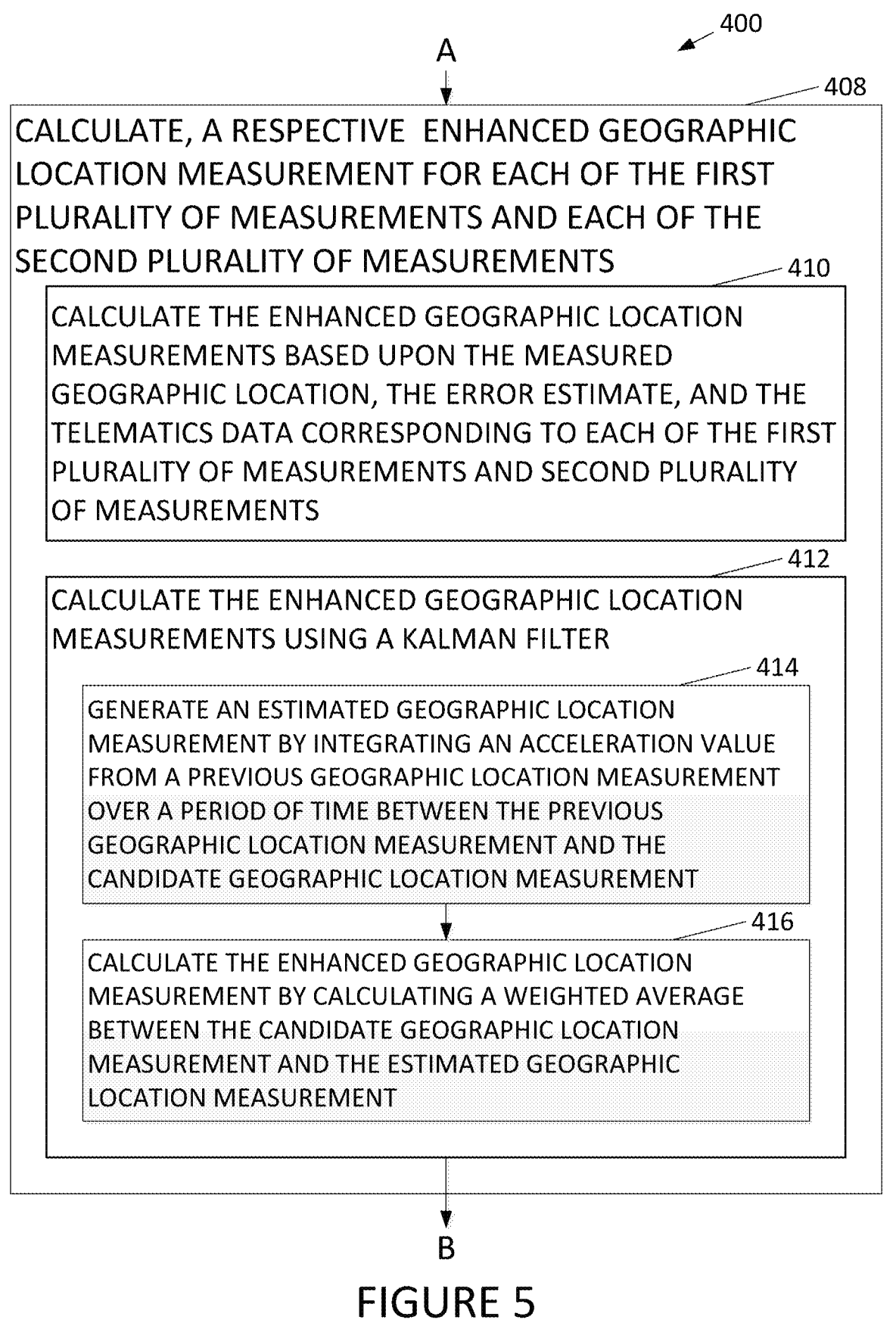

CALCULATE, A RESPECTIVE ENHANCED GEOGRAPHIC LOCATION MEASUREMENT FOR EACH OF THE FIRST PLURALITY OF MEASUREMENTS AND EACH OF THE SECOND PLURALITY OF MEASUREMENTS

410

CALCULATE THE ENHANCED GEOGRAPHIC LOCATION MEASUREMENTS BASED UPON THE MEASURED GEOGRAPHIC LOCATION, THE ERROR ESTIMATE, AND THE TELEMATICS DATA CORRESPONDING TO EACH OF THE FIRST PLURALITY OF MEASUREMENTS AND SECOND PLURALITY OF MEASUREMENTS

412

CALCULATE THE ENHANCED GEOGRAPHIC LOCATION MEASUREMENTS USING A KALMAN FILTER

414

GENERATE AN ESTIMATED GEOGRAPHIC LOCATION MEASUREMENT BY INTEGRATING AN ACCELERATION VALUE FROM A PREVIOUS GEOGRAPHIC LOCATION MEASUREMENT OVER A PERIOD OF TIME BETWEEN THE PREVIOUS GEOGRAPHIC LOCATION MEASUREMENT AND THE CANDIDATE GEOGRAPHIC LOCATION MEASUREMENT

416

CALCULATE THE ENHANCED GEOGRAPHIC LOCATION MEASUREMENT BY CALCULATING A WEIGHTED AVERAGE BETWEEN THE CANDIDATE GEOGRAPHIC LOCATION MEASUREMENT AND THE ESTIMATED GEOGRAPHIC LOCATION MEASUREMENT

Figure 6:
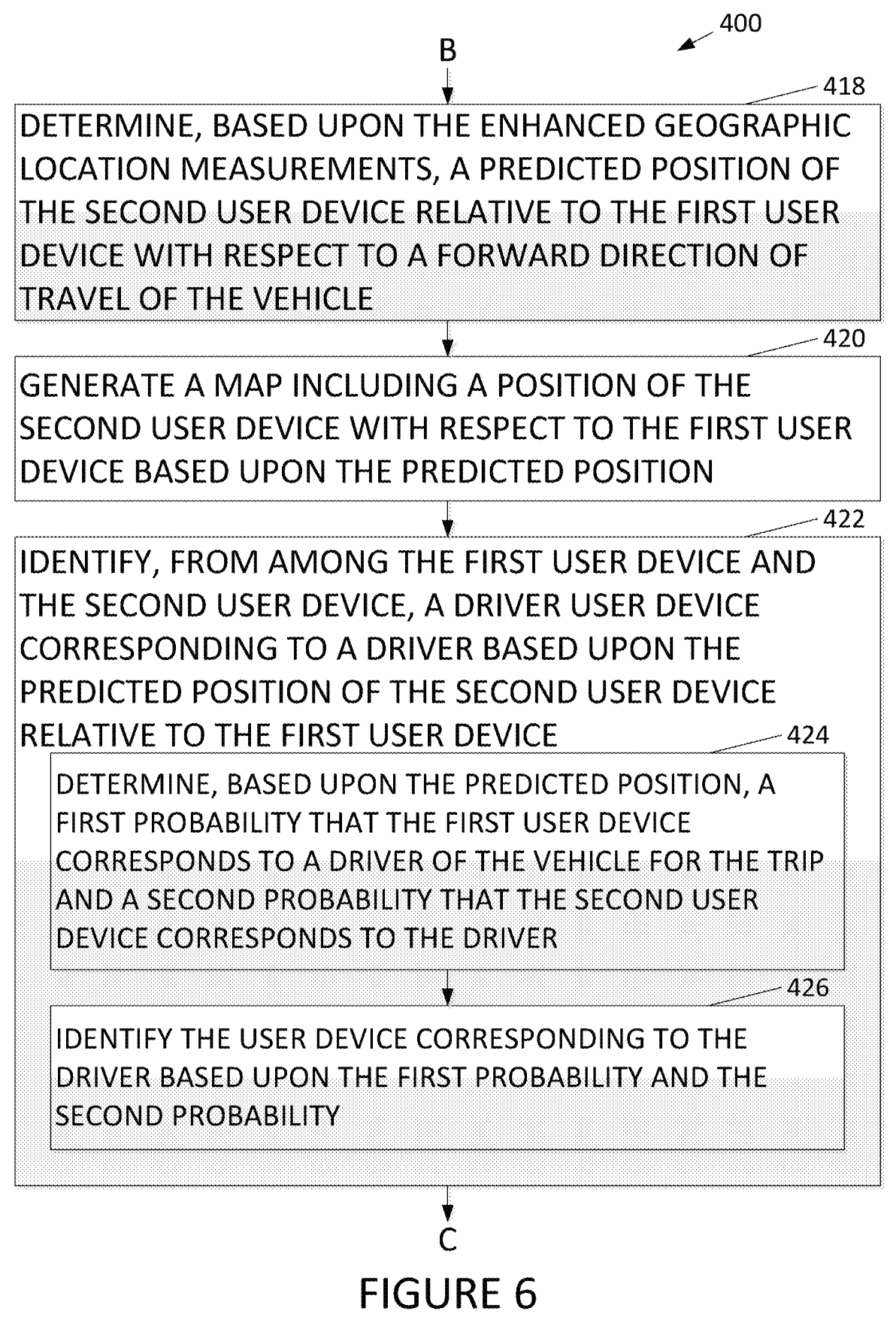

DETERMINE, BASED UPON THE ENHANCED GEOGRAPHIC LOCATION MEASUREMENTS, A PREDICTED POSITION OF THE SECOND USER DEVICE RELATIVE TO THE FIRST USER DEVICE WITH RESPECT TO A FORWARD DIRECTION OF TRAVEL OF THE VEHICLE
— 418

GENERATE A MAP INCLUDING A POSITION OF THE SECOND USER DEVICE WITH RESPECT TO THE FIRST USER DEVICE BASED UPON THE PREDICTED POSITION
— 420

IDENTIFY, FROM AMONG THE FIRST USER DEVICE AND THE SECOND USER DEVICE, A DRIVER USER DEVICE CORRESPONDING TO A DRIVER BASED UPON THE PREDICTED POSITION OF THE SECOND USER DEVICE RELATIVE TO THE FIRST USER DEVICE
— 422

DETERMINE, BASED UPON THE PREDICTED POSITION, A FIRST PROBABILITY THAT THE FIRST USER DEVICE CORRESPONDS TO A DRIVER OF THE VEHICLE FOR THE TRIP AND A SECOND PROBABILITY THAT THE SECOND USER DEVICE CORRESPONDS TO THE DRIVER
— 424

IDENTIFY THE USER DEVICE CORRESPONDING TO THE DRIVER BASED UPON THE FIRST PROBABILITY AND THE SECOND PROBABILITY
— 426

SYSTEMS AND METHODS FOR DETERMINING AN ACTUAL DRIVER OF A VEHICLE BASED AT LEAST IN PART UPON TELEMATICS DATA

CROSS-REFERENCE TO RELATED APPLICATIONS

This application is a continuation of U.S. patent application Ser. No. 17/694,291, filed on Mar. 14, 2022, which is a continuation of U.S. patent application Ser. No. 16/736,032, filed Jan. 7, 2020, patented as U.S. Pat. No. 11,297,465, which are incorporated by reference in their entirety.

FIELD OF THE INVENTION

The present disclosure relates to systems and methods for determining a driver of a vehicle, and more particularly, to systems and methods for determining a driver of a vehicle based at least in part upon global positioning system (GPS) data, gyroscope data, accelerometer data, and/or other telematics data.

BACKGROUND

Satellite navigation systems such as global positioning system (GPS) utilize satellites to provide geo-spatial positioning for a variety of applications. A GPS-equipped device may provide a location of the device with respect to, for example, a geographic coordinate system and/or geographic landmarks (e.g., streets, political entities, points of interest, etc.). Current GPS-equipped devices are generally not capable of determining the exact location of the device, but rather provide an estimate of the device's current location subject to some degree of error. For example, atmospheric effects (e.g., ionospheric delay) and/or artificial interference (e.g., a presence of metal and/or electromagnetic devices) may introduce error to a GPS-based determination of location. Accordingly, for applications that need a precise determination of location, a method of enhancing GPS measurements is desirable.

For example, some applications may benefit from an ability to identify of a driver of a vehicle for a trip using devices (e.g., mobile devices) carried by persons in the vehicle. Identifying the driver may be useful in applications that utilize telematics data to assess the driver of the vehicle, such as for insurance purposes. In such applications, the driver of the vehicle for a trip must be distinguished from passengers, so that telematics data captured during the trip may be used to assess how the driver is driving and not incorrectly assign the driver's driving tendencies to that of the passengers. However, currently available GPS technology lacks the precision to make an identification of an actual driver of a vehicle based on measured geographic coordinates alone.

BRIEF SUMMARY

The present embodiments may relate to, inter alia systems and methods for identifying a driver of a vehicle for a particular trip. Some embodiments of the present disclosure may use, for example, Kalman filtering and/or machine learning techniques to enhance geographic location measurements made by a global positioning system, such that the enhanced geographic location measurements may be used to identify a user device corresponding to the actual driver of the vehicle and not devices associated with passengers of the vehicle. In some embodiments, a usage-based insurance policy may be applied to the identified driver of the vehicle.

In one aspect, a driver identification (DI) computing device including at least one processor in communication with a memory device may be provided. The at least one processor may be configured to: (1) receive, from a first user device, a first plurality of measurements periodically captured at the first user device during a trip taken by a vehicle; (2) receive, from a second user device, a second plurality of measurements periodically captured at the second user device during the trip; (3) determine, based upon the first plurality of measurements and the second plurality of measurements, that the first user device and the second user device are within the vehicle during the trip; (4) calculate a respective enhanced geographic location measurement for each of the first plurality of measurements and each of the second plurality of measurements based upon the first plurality of measurements and the second plurality of measurements; (5) determine, based upon the enhanced geographic location measurements, a predicted position of the second user device relative to the first user device with respect to a forward direction of travel of the vehicle; and/or (6) identify, from among the first user device and the second user device, a driver user device corresponding to a driver based upon the predicted position of the second user device relative to the first user device. The DI computing device may include additional, less, or alternate functionality, including that discussed elsewhere herein.

In another aspect, a computer-implemented method for identifying a driver of a vehicle for a trip may be provided. The computer-implemented method may be implemented by a driver identification (DI) computing device including at least one processor in communication with a memory device. The computer-implemented method may include (1) receiving, by the DI computing device, from a first user device, a first plurality of measurements periodically captured at the first user device during a trip taken by a vehicle; (2) receiving, by the DI computing device, from a second user device, a second plurality of measurements periodically captured at the second user device during the trip; (3) determining, by the DI computing device, based upon the first plurality of measurements and the second plurality of measurements, that the first user device and the second user device are within the vehicle during the trip; (4) calculating, by the DI computing device, a respective enhanced geographic location measurement for each of the first plurality of measurements and each of the second plurality of measurements based upon the first plurality of measurements and the second plurality of measurements; (5) determining, by the DI computing device, based upon the enhanced geographic location measurements, a predicted position of the second user device relative to the first user device with respect to a forward direction of travel of the vehicle; and/or (6) identifying, by the DI computing device, from among the first user device and the second user device, a driver user device corresponding to a driver based upon the predicted position of the second user device relative to the first user device. The computer-implemented method may include additional, less, or alternate actions, including those discussed elsewhere herein.

In another aspect, at least one non-transitory computer-readable media having computer-executable instructions embodied thereon may be provided that, when executed by a driver identification (DI) computing device including at least one processor in communication with a memory device, cause the at least one processor to: (1) receive, from a first user device, a first plurality of measurements periodically captured at the first user device during a trip taken by a vehicle; (2) receive, from a second user device, a second plurality of measurements periodically captured at the second user device during the trip; (3) determine, based upon the first plurality of measurements and the second plurality of measurements, that the first user device and the second user device are within the vehicle during the trip; (4) calculate a respective enhanced geographic location measurement for each of the first plurality of measurements and each of the second plurality of measurements based upon the first plurality of measurements and the second plurality of measurements; (5) determine, based upon the enhanced geographic location measurements, a predicted position of the second user device relative to the first user device with respect to a forward direction of travel of the vehicle; and/or (6) identify, from among the first user device and the second user device, a driver user device corresponding to a driver based upon the predicted position of the second user device relative to the first user device. The computer-implemented instructions may direct additional, less, or alternate functionality, including that discussed elsewhere herein.

Various embodiments can include a computer-implemented method to determine a device of a driver. The method can include receiving, by a computing device and from a first user device, first telematics data. The method also can include receiving, by the computing device and from a second user device, second telematics data. The method further can include determining, using a trained machine learning model, patterns in the first and second telematics data. The method additionally can include determining, using the patterns in the first and second telematics data, relative positions of the first user device and the second user device. The method further can include determining, based on the relative positions of the first user device and the second user device, a predicted position of the first user device relative to the second user device. The method also can include identifying, by the computing device, that the first user device or the second user device is associated with the driver of a vehicle based at least in part upon the predicted position of the first user device relative to the second user device.

Several embodiments can include a system including one or more processors and one or more non-transitory computer-readable media storing computing instructions that, when executed on the one or more processors, cause the one or more processors to perform certain acts. The acts can include receiving, by a computing device and from a first user device, first telematics data. The acts also can include receiving, by the computing device and from a second user device, second telematics data. The acts further can include determining, using a trained machine learning model, patterns in the first and second telematics data. The acts additionally can include determining, using the patterns in the first and second telematics data, relative positions of the first user device and the second user device. The acts further can include determining, based on the relative positions of the first user device and the second user device, a predicted position of the first user device relative to the second user device. The acts also can include identifying, by the computing device, that the first user device or the second user device is associated with the driver of a vehicle based at least in part upon the predicted position of the first user device relative to the second user device.

Many embodiments can include one or more non-transitory computer-readable media storing computing instructions that, when executed by one or more processors, cause the one or more processors to perform certain acts. The acts can include receiving, by a computing device and from a first user device, first telematics data. The acts also can include receiving, by the computing device and from a second user device, second telematics data. The acts further can include determining, using a trained machine learning model, patterns in the first and second telematics data. The acts additionally can include determining, using the patterns in the first and second telematics data, relative positions of the first user device and the second user device. The acts further can include determining, based on the relative positions of the first user device and the second user device, a predicted position of the first user device relative to the second user device. The acts also can include identifying, by the computing device, that the first user device or the second user device is associated with the driver of a vehicle based at least in part upon the predicted position of the first user device relative to the second user device.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4 depicts an exemplary method for identifying a driver of a vehicle for a trip using the DI system illustrated in FIG. 1.

FIG. 5 is a continuation of the exemplary computer-implemented method shown in FIG. 4.

FIG. 6 is a continuation of the exemplary computer-implemented method shown in FIG. 5.

Figure 1:
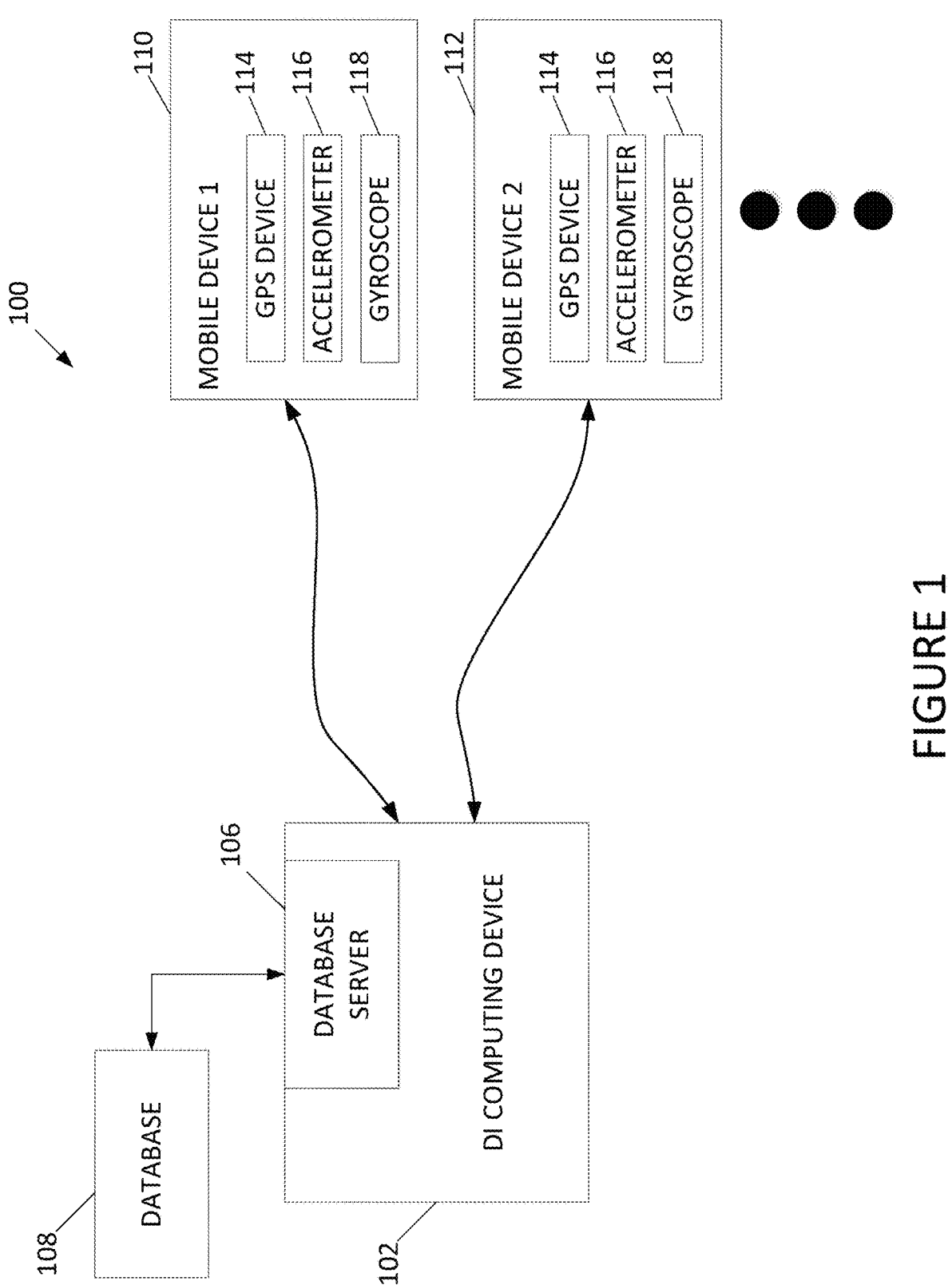
FIG. 1 depicts an exemplary driver identification (DI) system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for identifying a driver of a vehicle for a trip. In some embodiments, the systems and methods described herein may include receiving measurements of geographic location and other telematics data (e.g., acceleration, velocity, orientation, etc.) from a plurality of user devices (e.g., mobile devices) or other sensors present on the vehicle during the trip. Enhanced geographic location measurements may be calculated from the received measurements using a Kalman filter and telematics data. The enhanced geographic location measurements may then be used to determine a relative location of the plurality of user devices and calculate a probability for each user device that the user device corresponds to the driver of the vehicle. In one exemplary embodiment, the process may be performed by a driver identification (DI) computing device.

In some embodiments, the systems and methods described herein may additionally or alternatively include receiving, along with the measurements of geographic coordinates, telematics data (e.g., accelerometer and/or gyroscope measurements), and using the measured geographic coordinates and telematics data to calculate a probability for each user device that the user device corresponds to the driver of the vehicle.

As described below, systems and methods described herein generate enhanced geographic coordinate measurements to determine a probability that a user device corresponds to the actual driver of the vehicle as opposed to one of the passengers of the vehicle. As used herein, "driver" refers to a person actually driving a vehicle, and "passenger" refers to any person present in a vehicle that is not driving. By so doing, the driver of the vehicle for a particular trip may be identified.

In some exemplary embodiments, the systems and methods may be used to implement a usage-based insurance platform. In a usage-based insurance policy, an insurance premium corresponds to a driver's actual driving behavior. For example, the insurance premium may be based in part upon telematics data collected from a user device associated with the driver. It is thus advantageous to determine when a policy holder is actually driving a vehicle and when the policy holder is merely a passenger. By identifying a driver of a vehicle for a trip, the systems and methods enable telematics data collected for the trip to be applied in analyzing the identified driver.

Examples of Receiving Geographic Location Data and Telematics Data from User Devices The DI computing device may receive geographic coordinate data and/or telematics data from a plurality of user devices (e.g., mobile devices and/or other sensors mounted on or within the vehicle). The plurality of user devices may include components for capturing and generating data, such as a GPS device, an accelerometer, and/or any other device capable of capturing data (e.g., a gyroscope). The DI computing device may use the received geographic coordinate data and telematics data to determine a location of one of the plurality of user devices with respect to the other user devices.

The plurality of user devices may be equipped with, for example, a GPS device. The GPS device may utilize GPS techniques to determine a measurement of geographic coordinates of the corresponding user device. Because some factors (e.g., atmospheric effects) may reduce the precision of the GPS device, the GPS device may return, for example, an error estimate along with the measured geographic location. The measured geographic location and error estimate may provide an area (e.g., a radius around the measured geographic location) where the user device may be located with a probability above a threshold probability.

The plurality of user devices may also be equipped with, for example, an accelerometer and/or a gyroscope. The accelerometer may be capable of measuring a linear and/or angular acceleration of the corresponding user device at a given moment in time. The gyroscope may be capable of determining an orientation of the user device. Accordingly, the accelerometer and gyroscope together may be used to determine a direction of acceleration of the user device. Data generated by the accelerometer and gyroscope may be used (e.g., by the DI computing device or user device) to generate telematics data (e.g., a location, orientation, acceleration, velocity, etc.) of the corresponding user device. Such telematics data may be used by the DI computing device, for example, to generate an enhanced measurement of the geographic location of the user device to determine whether the user device corresponds to the driver of the vehicle for the trip, with a passenger in the vehicle, or with another driver driving closely to the candidate vehicle (e.g., the vehicle being analyzed by the DI computing device).

Examples of Calculating an Enhanced Geographic Location Measurement Using at Least a Kalman Filter The DI computing device may generate an enhanced geographic location measurement using a Kalman filter. A Kalman filter uses a series of measurements (e.g., geographic location measurements) containing statistical noise to produce estimates (e.g., the enhanced geographic location measurements) that tend to be more accurate than those based on a single measurement alone. A Kalman filter produces an estimate of a current state (e.g., a geographic location) and an uncertainty associated with the estimate, and when the next measurement is observed, updates the estimate using a weighted average, with more weight being given to estimates with less uncertainty. The enhanced geographic location measurement may be sufficiently precise to determine a relative position of the user devices over a period of time, which may be used to identify a user device corresponding to the driver of the vehicle.

To apply the Kalman filter, the DI computing device may analyze each measured geographic location with respect to the previous measurement. For each current geographic location measurement, the DI computing device may calculate an estimated geographic location measurement based upon a previous geographic location and telematics data. For example, the DI computing device may generate the geographic location estimate by integrating an acceleration value (e.g., a magnitude and direction of acceleration) associated with the previous geographic location measurement over a period of time between measurements to determine a displacement estimate (e.g., a displacement vector) from the previous geographic location, and add the displacement estimate to the previous geographic location measurement to determine the estimated geographic location measurement.

The DI computing device may then calculate the enhanced geographic location measurement by taking a weighted average of the current geographic location measurement and the estimated geographic location measurement. The weights assigned to the current and estimated geographic location measurements may be based, for example, on a predicted error of the current and estimated geographic location measurements, where a lesser predicted error corresponds to a greater weight.

Examples of Determining a Relative Position of User Devices Based at Least in Part Upon Enhanced Geographic Location Measurements In some exemplary embodiments, the DI computing device may determine a relative position of user devices based at least in part upon the generated enhanced geographic location measurements. The relative location may be, for example, a distance vector from a reference user device and/or a map of relative locations of user devices traveling together. In some embodiments, the DI computing device may utilize machine learning techniques to determine a relative position of the user devices based upon geographic location measurements.

For example, the DI computing device may determine that a first user device and a second user device are traveling in the same vehicle based on a determination that, over time, the first user device and the second user device have the same direction of travel, and the relative positions of the first user device and second user device remain constant with respect to the direction of travel. The DI computing device may further determine that the second user device is on average one meter to the right of and zero meters behind the first user device. In some embodiments, the DI computing device may generate a map depicting the relative position of the first user device and the second user device showing, for example, the second user device being one meter to the right of the first user device.

In some embodiments, the DI computing device may utilize machine learning techniques to determine the relative position of the user devices based upon telematics data. For example, the DI computing device may identify a certain pattern of received geographic location measurements from a first user device and a second user device as indicative of the first user device having a certain position relative to the second user device. When the DI computing device receives geographic location data that matches such a pattern, the DI computing device may determine the relative position of the user devices based on the pattern.

Examples of Determining a Relative Position of User Devices Based at Least in Part Upon Telematics Data In some exemplary embodiments, the DI computing device may determine a relative position of user devices based at least in part upon telematics data received from the user devices. Such telematics data may include, for example, the measured geographic location, an acceleration, a velocity, and/or an orientation of the user device. The relative location may be, for example, a distance vector from a reference user device and/or a map of relative locations of user devices traveling together.

For example, the DI computing device may determine that a first user device and a second user device are traveling in the same vehicle based on a determination that, over time, the first user device and the second user device are sufficiently proximate to each other have the same direction of travel. The DI computing device may then use telematics data to determine a relative position of the second user device with respect to the first user device.

In some embodiments, the DI computing device may use telematics data corresponding to horizontal movement (e.g., turning) of the vehicle to determine relative position of the user devices. For example, assume a first user device and a second user device are present in a vehicle, where the first user device is in a left (e.g., driver seat) position and the second user device is in a right (e.g., front passenger seat) position. If the vehicle makes a right turn, the first user device has a longer turning radius than the second user device. As a result, the first user device will experience a greater angular acceleration than the second user device as a result of the right turn of the vehicle. Accordingly, acceleration data measured by the accelerometer and gyroscope onboard the first user device and the accelerometer and gyroscope onboard the second user device may be used by the DI computing device to determine that the first user device is to the left of the second user device with respect to the direction of forward movement of the vehicle.

In some embodiments, the DI computing device may use telematics data corresponding to vertical movement (e.g., moving up and/or down inclines) of the vehicle to determine relative position of the user device. For example, assume a first user device and a second user device are present in a vehicle, where the first user device is in a front position and the second user device is in a rear position. If the degree of incline at which the vehicle is moving changes (e.g., the vehicle begins to move up or down a hill, over a bump, etc.), the first user device will experience a change in vertical acceleration before the second user device. Accordingly, the DI computing device may analyze the vertical acceleration of the first user device and second user device over time to determine that there is a delay between vertical acceleration of the first user device and the vertical acceleration of the second user device. Because this delay is related to the relative position of the first user device and the second user device and the forward speed at which the vehicle is traveling, the DI computing device may use this information to determine that the first user device is a certain distance forward of the second user device with respect to the direction of forward movement of the vehicle.

In some embodiments, the DI computing device may utilize machine learning techniques to determine the relative position of the user devices based upon telematics data. For example, the DI computing device may identify a certain pattern in telematics data as indicative of a first user device having a certain position relative to a second user device. When the DI computing device receives telematics data that matches such a pattern, the DI computing device may determine the relative position of the user devices based on the pattern.

Examples of Identifying a Driver Based at Least in Part Upon a Relative Position of User Devices The DI computing device may identify the driver based upon a relative position of user devices. In some embodiments, the DI computing device may utilize, for example, machine learning techniques to determine a probability that each analyzed user device corresponds to the vehicle. The DI computing device may then identify the user device having the highest probability of corresponding to the driver of the vehicle as being the user device associated with the driver of the vehicle.

For example, the DI computing device may determine, based upon a determined relative position of a first user device and a second user device, that the first user device has an 80 percent chance of corresponding to a driver of the vehicle, the second user device has a 10 percent chance of corresponding the driver, and that there is a 10 percent chance that both the first user device and the second user device do not correspond to the driver. The DI computing device may identify the first user device as corresponding to the driver of the vehicle.

In some embodiments, the DI computing device may verify the identification of the driver. For example, the DI computing device may transmit a verification message to the first user device via a text message and/or via a mobile application (app) running on the first user device. The message may include an indication that the first user device has been identified as corresponding to the driver and requesting a user associated with the first user device confirm the identification. If the user responds in the affirmative, the DI computing device may identify the first user device as corresponding to a driver. If the user responds in the negative, the DI computing device may identify another user device, such as the next most likely user device (e.g., the second user device), as the user device corresponding to the driver. In some embodiments, the DI computing device may use the confirmation responses to improve a machine learning model used to determine the relative position of user devices and/or identify the user device corresponding to the driver.

Exemplary Insurance Applications of Identifying a Driver

In some exemplary embodiments, the DI computing device may be used to implement a usage-based insurance platform. In a usage-based insurance policy, an insurance premium corresponds to a driver's actual driving behavior. For example, the insurance premium may be based in part upon telematics data collected from a user device associated with the driver. Thus, for usage-based insurance, it is important to determine when the insured is actually driving the vehicle. By identifying a driver of a vehicle for a trip, the DI computing device enables telematics data collected for the trip to be applied in analyzing the identified driver.

At least one of the technical problems addressed by this system may include: (i) inability of a GPS device to provide a geographic location measurement sufficiently precise to be used to identify the driver of a vehicle; (ii) inability of a computing device to automatically identify a driver of a vehicle based upon telematics data; (iii) inefficiency in identifying a driver of a vehicle due to an inability of a computing device to automatically identify a driver of the vehicle based upon telematics data; (iv) inefficiency in providing usage-based insurance coverage due to an inability of a computing device to automatically identify the driver of a vehicle in order to apply telematics data associated with the trip to a usage-based insurance policy associated with the driver.

A technical effect of the systems and processes described herein may be achieved by performing at least one of the following steps: (i) receiving, from a first user device, a first plurality of measurements periodically captured at the first user device during a trip taken by a vehicle; (ii) receiving, from a second user device, a second plurality of measurements periodically captured at the second user device during the trip; (iii) determining, based upon the first plurality of measurements and the second plurality of measurements, that the first user device and the second user device are within the vehicle during the trip; (iv) calculating, a respective enhanced geographic location measurement for each of the first plurality of measurements and each of the second plurality of measurements based upon the first plurality of measurements and the second plurality of measurements; (v) determining, based upon the enhanced geographic location measurements, a predicted position of the second user device relative to the first user device with respect to a forward direction of travel of the vehicle; and (vi) identifying, from among the first user device and the second user device, a driver user device corresponding to a driver based upon the predicted position of the second user device relative to the first user device.

The technical effect achieved by this system may be at least one of: (i) ability of a GPS device to provide a geographic location measurement sufficiently precise to be used to identify the driver of a vehicle; (ii) ability of a computing device to automatically identify a driver of a vehicle based upon telematics data; (iii) increased efficiency in identifying a driver of a vehicle due to an ability of a computing device to automatically identify a driver of the vehicle based upon telematics data; (iv) increased efficiency in providing usage-based insurance coverage due to an ability of a computing device to automatically identify the driver of a vehicle in order to apply telematics data associated with the trip to a usage-based insurance policy associated with the driver.

Exemplary System for Identifying a Driver of a Vehicle

FIG. 1 depicts an exemplary driver identification (DI) system 100. DI system 100 may include a DI computing device 102. DI computing device 102 may include a database server 106. DI computing device 102 may be in communication with, for example, one or more of a database 108, a first user device 110, and/or a second user device 112. First user device 110 and second user device 112 may be, for example, mobile devices. In some embodiments, DI computing device 102 may communicate with additional user devices similar to first user device 110 and second user device 112. In some embodiments, DI computing device may be associated with, for example, an insurer providing a usage-based insurance policy to individuals associated with first user device 110 and/or second user device 112.

DI computing device 102 may receive geographic coordinate data and/or telematics data from first user device 110, second user device 112 and/or other sensors. First user device 110 and second user device 112 may include components for capturing and generating data, such as a GPS device 114, an accelerometer 116, a gyroscope 118, and/or any other device capable of capturing data. DI computing device 102 may use the received geographic coordinate data and telematics data to determine a location of one of first user device 110 and second user device 112 with respect to the other user device.

First user device 110 and second user device 112 may be equipped with, for example, GPS device 114. GPS device 114 may utilize GPS techniques to determine a measurement of geographic coordinates of the corresponding user device. Because some factors (e.g., atmospheric effects) may reduce the precision of GPS device 114, GPS device 114 may return, for example, an error estimate along with the measured geographic location. The measured geographic location and error estimate may provide an area (e.g., a radius around the measured geographic location) where the corresponding user device may be located with a probability above a threshold probability.

First user device 110 and second user device 112 may also be equipped with, for example, accelerometer 116 and/or gyroscope 118. Accelerometer 116 may be capable of measuring a linear and/or angular acceleration of the corresponding user device at a given moment in time. Gyroscope

118 may be capable of determining an orientation of the user device. Accordingly, accelerometer 116 and gyroscope 118 together may be used to determine a direction of acceleration of the user device. Data generated by accelerometer 116 and gyroscope 118 may be used (e.g., by DI computing device 102 or first user device 110 and second user device 112) to generate telematics data (e.g., a location, orientation, acceleration, velocity, etc.) of the corresponding user device. Such telematics data may be used by DI computing device 102, for example, to generate an enhanced measurement of the geographic location of the user device to determine whether the user device corresponds to the driver of the vehicle for the trip or with a passenger in the vehicle, or with a another driver driving closely to the candidate vehicle (e.g., the vehicle being analyzed by DI computing device 102).

DI computing device 102 may generate an enhanced geographic location measurement using a Kalman filter. A Kalman filter uses a series of measurements (e.g., geographic location measurements) containing statistical noise to produce estimates (e.g., the enhanced geographic location measurements) that tend to be more accurate than those based on a single measurement alone. A Kalman filter produces an estimate of a current state (e.g., a geographic location) and an uncertainty associated with the estimate, and when a measurement corresponding to the current state is observed, updates the estimate using a weighted average, with more weight being given to estimates with less uncertainty. The enhanced geographic location measurement may be sufficiently precise to determine a relative position of first user device 110 and second user device 112 over a period of time, which may be used to identify a user device corresponding to the driver of the vehicle.

To apply the Kalman filter, the DI computing device 102 may analyze each measured geographic location with respect to the previous measurement. For each current geographic location measurement, DI computing device 102 may calculate an estimated geographic location measurement based upon a previous geographic location and telematics data. For example, DI computing device 102 may generate the geographic location estimate by integrating an acceleration value (e.g., a magnitude and direction of acceleration) associated with the previous geographic location measurement over a period of time between measurements to determine a displacement estimate (e.g., a displacement vector) from the previous geographic location, and add the displacement estimate to the previous geographic location measurement to determine the estimated geographic location measurement.

DI computing device 102 may then calculate the enhanced geographic location measurement by taking a weighted average of the current geographic location measurement and the estimated geographic location measurement. The weights assigned to the current and estimated geographic location measurements may be based, for example, on a predicted error of the current and estimated geographic location measurements, where a lesser predicted error corresponds to a greater weight.

In some exemplary embodiments, DI computing device 102 may determine a relative position of first user device 110 and second user device 112 based at least in part upon the generated enhanced geographic location measurements. The relative location may be, for example, a distance vector from a reference user device (e.g., first user device 110) and/or a map of relative locations of first user device 110 and second user device 112 traveling together. In some embodiments, DI computing device 102 may utilize machine learning techniques to determine a relative position of first user device 110 and second user device 112 based upon the geographic location measurements.

For example, DI computing device 102 may determine that first user device 110 and second user device 112 are traveling in the same vehicle based on a determination that, over time, first user device 110 and second user device 112 have the same direction of travel, and the relative positions of first user device 110 and second user device 112 remain constant with respect to the direction of travel. DI computing device 102 may further determine that second user device 112 is on average one meter to the right of and zero meters behind first user device 110. In some embodiments, DI computing device 102 may generate a map depicting the relative position of first user device 110 and second user device 112 showing, for example, second user device 112 being one meter to the right of first user device 110.

In some embodiments, DI computing device 102 may utilize machine learning techniques to determine the relative position of first user device 110 and second user device 112 based upon telematics data. For example, DI computing device 102 may identify a certain pattern of received geographic location measurements from first user device 110 and second user device 112 as indicative of first user device 110 having a certain position relative to second user device 112. When DI computing device 102 receives geographic location data that matches such a pattern, DI computing device 102 may determine the relative position of first user device 110 and second user device 112 based on the pattern.

In some exemplary embodiments, DI computing device 102 may determine a relative position of first user device 110 and second user device 112 based at least in part upon telematics data received from first user device 110 and second user device 112. Such telematics data may include, for example, the measured geographic location, an acceleration, a velocity, and/or an orientation of first user device 110 and second user device 112. The relative location may be, for example, a distance vector from a reference user device (e.g., first user device 110) and/or a map of relative locations of first user device 110 and second user device 112 traveling together.

For example, DI computing device 102 may determine that first user device 110 and second user device 112 are traveling in the same vehicle based on a determination that, over time, first user device 110 and second user device 112 are sufficiently proximate to each other have the same direction of travel. DI computing device 102 may then use telematics data to determine a relative position of second user device 112 with respect to first user device 110.

In some embodiments, DI computing device 102 may use telematics data corresponding to horizontal movement (e.g., turning) of the vehicle to determine relative position of the user devices. For example, assume first user device 110 and second user device 112 are present in a vehicle, where first user device 110 is in a left (e.g., driver seat) position and second user device 112 is in a right (e.g., front passenger seat) position. If the vehicle makes a right turn, first user device 110 has a longer turning radius than second user device 112. As a result, first user device 110 will experience a greater angular acceleration than second user device 112 as a result of the right turn of the vehicle. Accordingly, acceleration data measured by accelerometer 116 and gyroscope 118 onboard first user device 110 and accelerometer 116 and gyroscope 118 onboard second user device 112 may be used by DI computing device 102 to determine that first user device 110 is to the left of second user device 112 with respect to the direction of forward movement of the vehicle.

In some embodiments, DI computing device 102 may use telematics data corresponding to vertical movement (e.g., moving up and/or down inclines) of the vehicle to determine relative position of first user device 110 and second user device 112. For example, assume first user device 110 and second user device 112 are present in a vehicle, where first user device 110 is in a front position and second user device 112 is in a rear position. If the degree of incline at which the vehicle is moving changes (e.g., the vehicle begins to move up or down a hill, over a bump, etc.), first user device 110 will experience a change in vertical acceleration before second user device 112. Accordingly, DI computing device 102 may analyze the vertical acceleration of the first user device 110 and second user device 112 over time to determine that there is a delay between vertical acceleration of first user device 110 and vertical acceleration of the second user device 112. Because this delay is related to the relative position of first user device 110 and second user device 112 and the forward speed at which the vehicle is traveling, DI computing device 102 may use this information to determine that first user device 110 is a certain distance forward of second user device 112 with respect to the direction of forward movement of the vehicle.

In some embodiments, DI computing device 102 may utilize machine learning techniques to determine the relative position of the user devices based upon telematics data. For example, DI computing device 102 may identify a certain pattern in telematics data as indicative of first user device 110 having a certain position relative to second user device 112. When DI computing device 102 receives telematics data that matches such a pattern, DI computing device 102 may determine the relative position of first user device 110 and second user device 112 based on the pattern.

DI computing device 102 may identify the driver based upon a relative position of user devices. In some embodiments, DI computing device 102 may utilize, for example, machine learning techniques to determine a probability that first user device 110 and second user device 112 corresponds to the driver of vehicle. DI computing device 102 may then identify the user device having the highest probability of corresponding to the driver of the vehicle as being the user device associated with the driver of the vehicle.

For example, DI computing device 102 may determine, based upon a determined relative position of first user device 110 and second user device 112, that first user device 110 has an 80 percent chance of corresponding to a driver of the vehicle, second user device 112 has a 10 percent chance of corresponding the driver, and that there is a 10 percent chance that both first user device 110 and second user device 112 do not correspond to the driver. DI computing device 102 may identify first user device 110 as corresponding to the driver of the vehicle.

In some embodiments, DI computing device 102 may verify the identification of the driver. For example, DI computing device 102 may transmit a verification message to first user device 110 via a text message and/or via a mobile application (app) running on first user device 110. The message may include an indication that first user device 110 has been identified as corresponding to the driver and requesting a user associated with first user device 110 confirm the identification. If the user responds in the affirmative, DI computing device 102 may identify first user device 110 as corresponding to a driver. If the user responds in the negative, DI computing device 102 may identify another user device, such as the next most likely user device (e.g., second user device 112), as the user device corresponding to the driver. In some embodiments, DI computing device 102 may use the confirmation responses to improve a machine learning model used to determine the relative position of user devices and/or identify the user device corresponding to the driver.

In some exemplary embodiments, DI computing device 102 may be used to implement a usage-based insurance platform. In a usage-based insurance policy, an insurance premium corresponds to a driver's actual driving behavior. For example, the insurance premium may be based in part upon telematics data collected from a user device associated with the driver. Thus, for usage-based insurance, it is important to determine when the insured is actually driving the vehicle. By identifying a driver of a vehicle for a trip, DI computing device 102 enables telematics data collected for the trip to be applied in analyzing the identified driver.

Exemplary Client Computing Device

Figure 2:
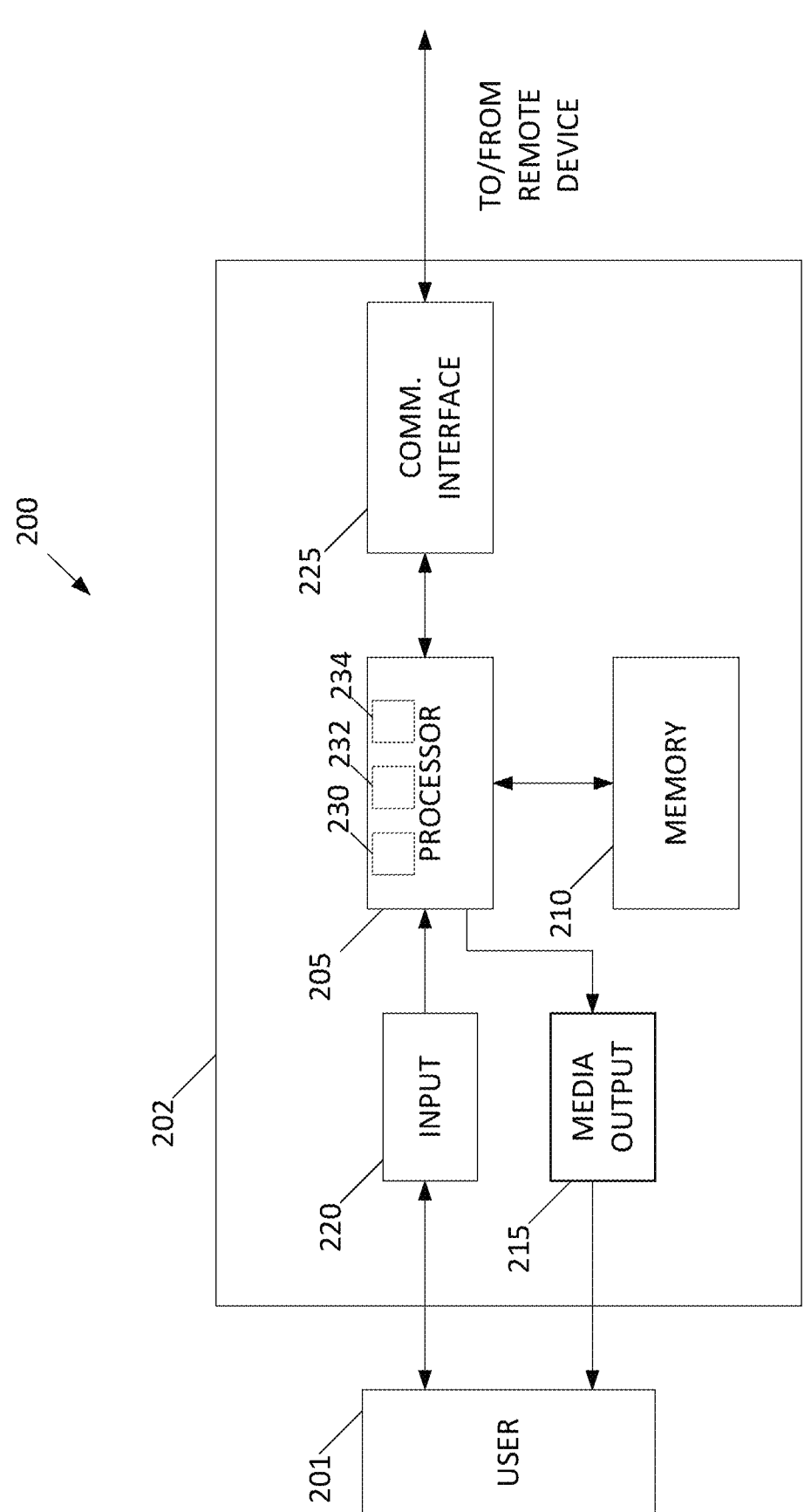
FIG. 2 an exemplary client computing device that may be used with the DI system illustrated in FIG. 1.

FIG. 2 depicts an exemplary client computing device 202 that may be used with DI system 100 shown in FIG. 1. Client computing device 202 may be, for example, at least one of DI computing devices 102, first user device 110, and/or second user device 112 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In the exemplary embodiments, processor 205 may include and/or be communicatively coupled to one or more modules for implementing the systems and methods described herein. Processor 205 may include a determining module 230 configured to determine, based upon a first plurality of measurements and a second plurality of measurements, that a first user device and a second user device are traveling on the trip, and to determine, based upon an enhanced geographic location measurement for each of the first plurality of measurements and for each of the second plurality of measurements, a predicted position of the second user device relative to the first user device with respect to a forward direction of travel of a vehicle. Processor 205 may further include a calculating module 232 configured to calculate, using a Kalman filter, an enhanced geographic location measurement for each of the first plurality of measurements and each of the second plurality of measurements based upon the measured geographic location, the error estimate, and the telematics data corresponding to each of the first plurality of measurements and second plurality of measurements. Processor 205 may further include a identifying module 234 configured to identify, from among the first user device and the second user device, a user device corresponding to a driver based upon the predicted position of the second user device relative to the first user device.

In exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED)

display, organic light emitting diode (OLED) display, cathode ray tube (CRT) display, "electronic ink" display, or a projected display) or an audio output device (e.g., a speaker or headphones). Media output component 215 may be configured to, for example, display an alert message identifying a statement as potentially false.

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as DI computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 may be, for example, computer-readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
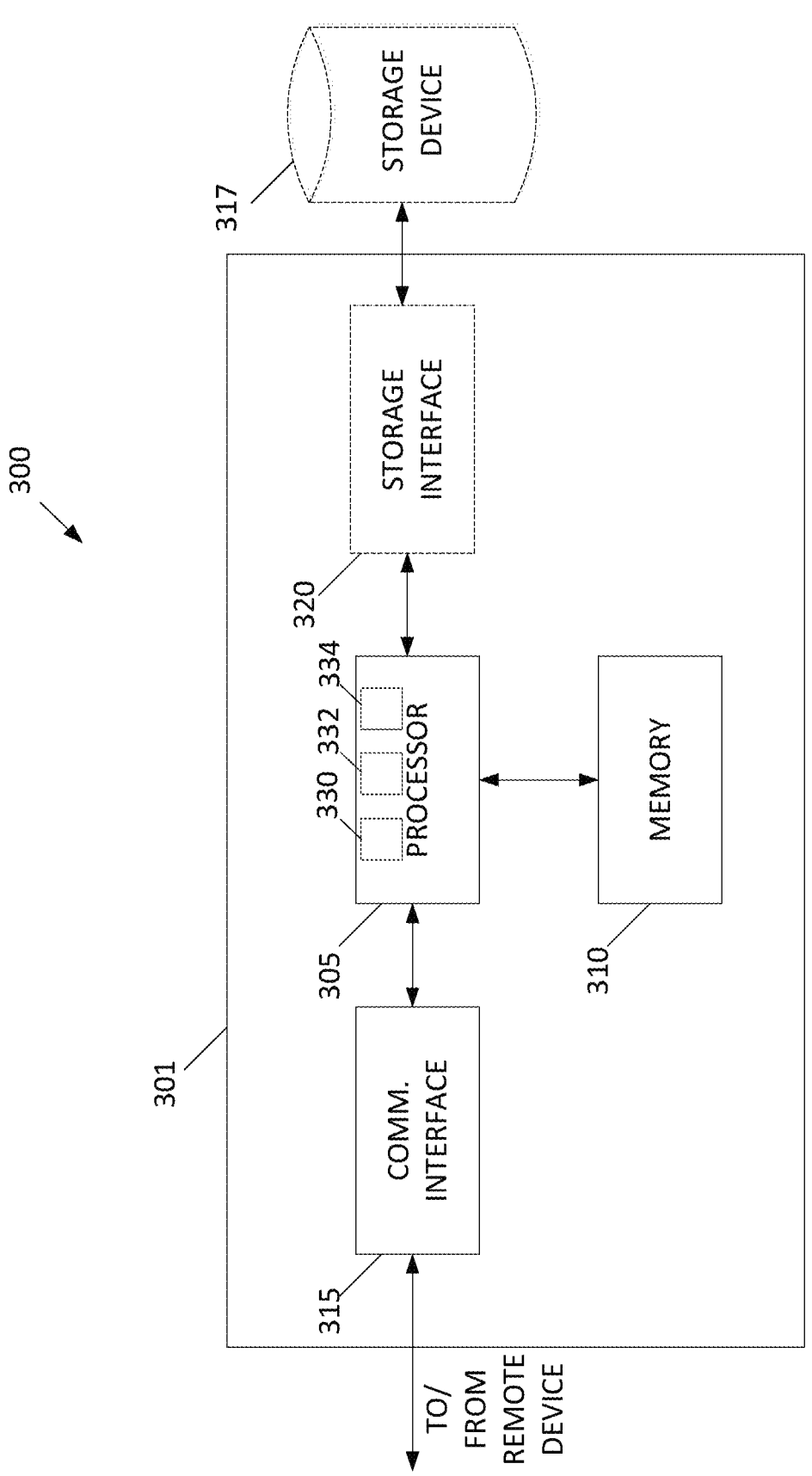
FIG. 3 depicts an exemplary server system that may be used with the DI system illustrated in FIG. 1.
Figure 7:
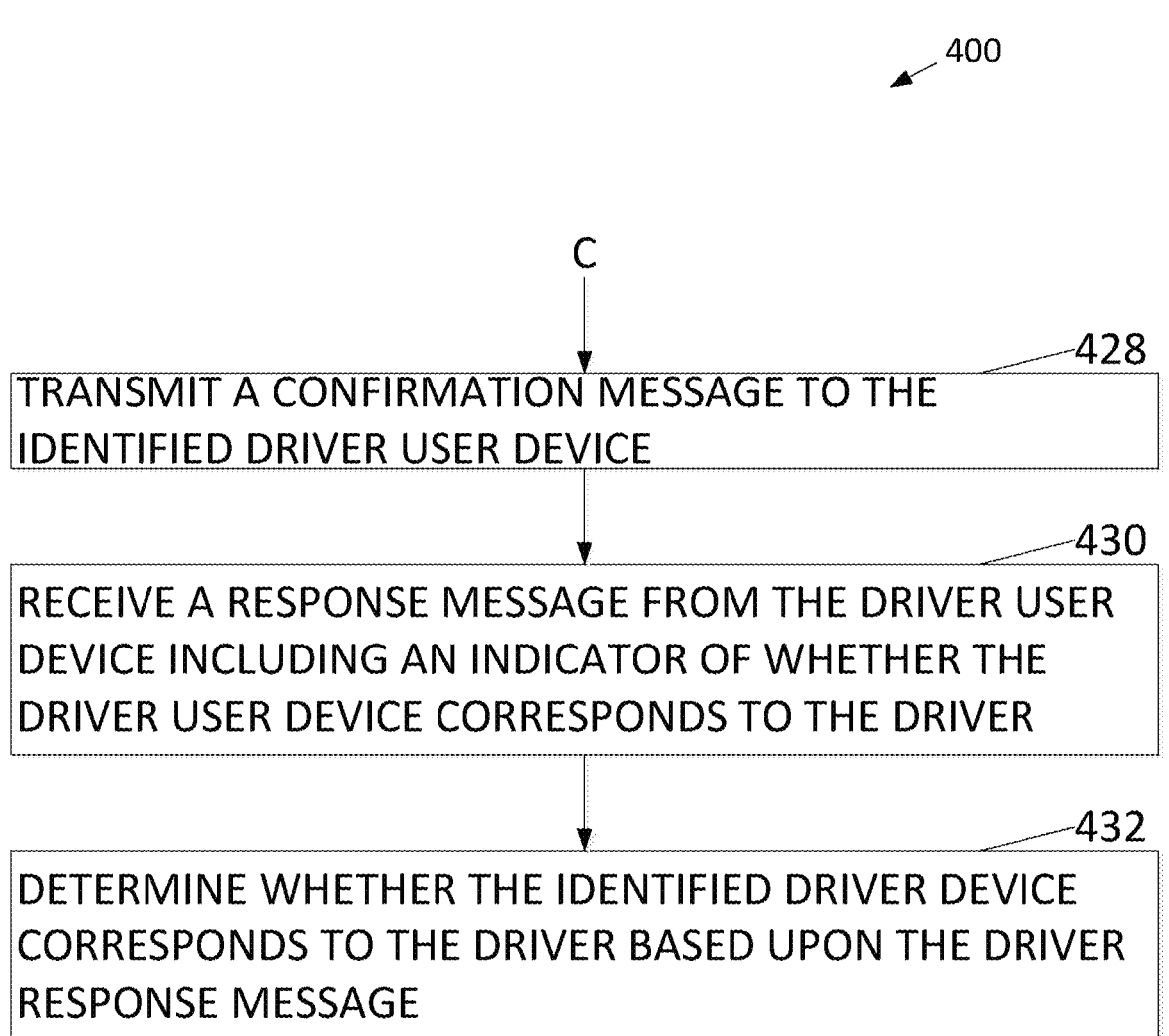
FIG. 7 is a continuation of the exemplary computer-implemented method shown in FIG. 6.

FIG. 3 depicts an exemplary server system 301 that may be used with DI system 100 illustrated in FIG. 1. Server system 301 may be, for example, DI computing device 102 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be needed in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server system 301 is capable of communicating with DI computing device 102, first user device 110, second user device 112 (all shown in FIG. 1), and/or another server system 301. For example, communication interface 315 may receive requests from first user device 110 and/or second user device 112 via the Internet.

Processor 305 may also be operatively coupled to a storage device 317, such as database 120 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317. In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

In the exemplary embodiments, processor 305 may include and/or be communicatively coupled to one or more modules for implementing the systems and methods described herein. Processor 305 may include a determining module 330 configured to determine, based upon the first plurality of measurements and the second plurality of measurements, that the first user device and the second user device are within the vehicle during the trip, and to determine, based upon the enhanced geographic location measurements, a predicted position of the second user device relative to the first user device with respect to a forward direction of travel of the vehicle. Processor 305 may further include a calculating module 332 configured to calculate, a respective enhanced geographic location measurement for each of the first plurality of measurements and each of the second plurality of measurements based upon the first plurality of measurements and the second plurality of measurements. Processor 305 may further include a identifying module 334 configured to identify, from among the first user device and the second user device, a driver user device corresponding to a driver based upon the predicted position of the second user device relative to the first user device.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Method for Identifying a Driver

FIGS. 4-7 depict an exemplary method 400 for identifying a driver of a vehicle for a trip. Method 400 may be performed by DI computing device 102 (shown in FIG. 1).

Method 400 may include receiving 402, from a first user device (e.g., first user device 110 shown in FIG. 1), a first plurality of measurements periodically captured at the first user device during a trip taken by a vehicle. In some embodiments, each of the first plurality of measurements includes a measured geographic location, an error estimate, and telematics data corresponding to the measured geographic location.

Method 400 may further include receiving 404, from a second user device (e.g., second user device 112 shown in FIG. 1), receive, from a second user device, a second plurality of measurements periodically captured at the second user device during the trip. In some embodiments, each of the second plurality of measurements includes a measured geographic location, an error estimate, and telematics data corresponding to the measured geographic location.

Method 400 may further include determining 406, based upon the first plurality of measurements and the second plurality of measurements, that the first user device and the second user device are within the vehicle during the trip. In some embodiments, determining 406 that the first user device and the second user device are traveling on the trip may be performed by determining module 330 (shown in FIG. 3).

Method 400 may further include calculating 408 a respective enhanced geographic location measurement for each of the first plurality of measurements and each of the second plurality of measurements based upon the first plurality of measurements and the second plurality of measurements. In some embodiments, calculating 408 the enhanced geographic location measurement may be performed by calculating module 332 (shown in FIG. 3). In some embodiments, calculating 408 the enhanced geographic location measurements includes calculating 410 the enhanced geographic location measurements based upon the measured geographic location, the error estimate, and the telematics data corresponding to each of the first plurality of measurements and second plurality of measurements. In some embodiments, calculating 408 the enhanced geographic location measurements includes calculating 412 the enhanced geographic location measurements using a Kalman filter. In such embodiments, calculating 408 the enhanced geographic location measurement may include generating 414 generate an estimated geographic location measurement by integrating an acceleration value from a previous geographic location measurement over a period of time between the previous geographic location measurement and the candidate geographic location measurement and calculating 416 calculate the enhanced geographic location measurement by calculating a weighted average between the candidate geographic location measurement and the estimated geographic location measurement.

Method 400 may further include determining 418, based upon the enhanced geographic location measurements, a predicted position of the second user device relative to the first user device with respect to a forward direction of travel of the vehicle. In some embodiments, determining 418 the predicted position may be performed by determining module 330 (shown in FIG. 3). In some embodiments, method 400 may further include generating 440 a map including a position of the second user device with respect to the first user device based upon the predicted position.

Method 400 may further include identifying 422, from among the first user device and the second user device, a driver user device corresponding to a driver based upon the predicted position of the second user device relative to the first user device. In some embodiments, identifying 418 the user device corresponding to the driver may be performed by identifying module 334 (shown in FIG. 3). In some embodiments, identifying 422 the user device corresponding to the driver may include determining 424, based upon the predicted position, a first probability that the first user device corresponds to a driver of the vehicle for the trip and a second probability that the second user device corresponds to the driver and identifying 426 the driver user device to the driver based upon the first probability and the second probability.

In some embodiments, method 400 may further include transmitting 428 transmit a confirmation message to the identified driver user device, receiving 430 receive a response message from the driver user device including an indicator of whether the driver user device corresponds to the driver, and determining 432 whether the identified driver device corresponds to the driver based upon the driver response message.

The method 400 may include additional, less, or alternate actions, including those discussed elsewhere herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be needed to find its own structure in unlabeled example inputs.

As described above, the systems and methods described herein may use machine learning, for example, for pattern recognition. That is, machine learning algorithms may be used by DI computing device 102, for example, to identify patterns in GPS data and telematics data to determine when a plurality of user devices are traveling in a same vehicle on a trip, to determine a position of one user device relative to another user device, and to identify a user device corresponding to a driver of the vehicle. Accordingly, the systems and methods described herein may use machine learning algorithms for both pattern recognition and predictive modeling.

Exemplary Embodiments

In one aspect, a driver identification (DI) computing device including at least one processor in communication with a memory device may be provided. The at least one processor may be configured to: (1) receive, from a first user device, a first plurality of measurements periodically captured at the first user device during a trip taken by a vehicle; (2) receive, from a second user device, a second plurality of measurements periodically captured at the second user device during the trip; (3) determine, based upon the first plurality of measurements and the second plurality of measurements, that the first user device and the second user device are within the vehicle during the trip; (4) calculate a respective enhanced geographic location measurement for each of the first plurality of measurements and each of the second plurality of measurements based upon the first plurality of measurements and the second plurality of measurements; (5) determine, based upon the enhanced geographic location measurements, a predicted position of the second user device relative to the first user device with respect to a forward direction of travel of the vehicle; and/or (6) identify, from among the first user device and the second user device, a driver user device corresponding to a driver based upon the predicted position of the second user device relative to the first user device. The DI computing device may include additional, less, or alternate functionality, including that discussed elsewhere herein.

A further enhancement of the DI computing device may include at least one processor, wherein each of the first plurality of measurements and each of the second plurality of measurements includes a measured geographic location, an error estimate, and telematics data corresponding to the measured geographic location.

A further enhancement of the DI computing device may include at least one processor, wherein the at least one processor is configured to calculate the enhanced geographic location measurements based upon the measured geographic location, the error estimate, and the telematics data corresponding to each of the first plurality of measurements and second plurality of measurements.

A further enhancement of the DI computing device may include at least one processor, wherein the at least one processor is configured to calculate the enhanced geographic location measurements using a Kalman filter.

A further enhancement of the DI computing device may include at least one processor, wherein the telematics data includes an acceleration value, wherein to calculate the enhanced geographic location measurement for a candidate geographic location measurement, the at least one processor is configured to generate an estimated geographic location measurement by integrating an acceleration value from a previous geographic location measurement over a period of time between the previous geographic location measurement and the candidate geographic location measurement and calculate the enhanced geographic location measurement by calculating a weighted average between the candidate geographic location measurement and the estimated geographic location measurement.

A further enhancement of the DI computing device may include at least one processor, wherein to identify the user device corresponding to the driver, the at least one processor is configured to determine, based upon the predicted position, a first probability that the first user device corresponds to a driver of the vehicle for the trip and a second probability that the second user device corresponds to the driver and identify the driver user device based upon the first probability and the second probability.

A further enhancement of the DI computing device may include at least one processor, wherein the at least one processor is further configured to generate a map including a position of the second user device with respect to the first user device based upon the predicted position.

A further enhancement of the DI computing device may include at least one processor, wherein the at least one processor is further configured to transmit a confirmation message to the identified driver user device, receive a response message from the driver user device including an indicator of whether the driver user device corresponds to the driver, and determine whether the identified driver device corresponds to the driver based upon the driver response message.

A further enhancement of the DI computing device may include at least one processor, wherein the at least one processor is further configured to receive, from a third user device, a third plurality of measurements periodically captured at the third user device during the trip, determine, based upon the third plurality of measurements, that the third user device is within the vehicle during the trip, calculate a respective enhanced geographic location measurement for each of the third plurality of measurements based upon the third plurality of measurements, determine, based upon the enhanced geographic location measurements, a predicted position of the third user device relative to the first user device with respect to a forward direction of travel of the vehicle, and identify, from among the first user device, the second user device, and the third user device, a driver user device corresponding to a driver based upon the predicted position of the second user device relative to the first user device.

In another aspect, a computer-implemented method for identifying a driver of a vehicle for a trip may be provided. The computer-implemented method may be implemented by a driver identification (DI) computing device including at least one processor in communication with a memory device. The computer-implemented method may include (1) receiving, by the DI computing device, from a first user device, a first plurality of measurements periodically captured at the first user device during a trip taken by a vehicle; (2) receiving, by the DI computing device, from a second user device, a second plurality of measurements periodically captured at the second user device during the trip; (3)

determining, by the DI computing device, based upon the first plurality of measurements and the second plurality of measurements, that the first user device and the second user device are within the vehicle during the trip; (4) calculating, by the DI computing device, a respective enhanced geographic location measurement for each of the first plurality of measurements and each of the second plurality of measurements based upon the first plurality of measurements and the second plurality of measurements; (5) determining, by the DI computing device, based upon the enhanced geographic location measurements, a predicted position of the second user device relative to the first user device with respect to a forward direction of travel of the vehicle; and/or (6) identifying, by the DI computing device, from among the first user device and the second user device, a driver user device corresponding to a driver based upon the predicted position of the second user device relative to the first user device. The computer-implemented method may include additional, less, or alternate actions, including those discussed elsewhere herein.

A further enhancement of the computer-implemented method may include wherein each of the first plurality of measurements and each of the second plurality of measurements includes a measured geographic location, an error estimate, and telematics data corresponding to the measured geographic location.

A further enhancement of the computer-implemented method may include calculating, by the DI computing device, the enhanced geographic location measurements based upon the measured geographic location, the error estimate, and the telematics data corresponding to each of the first plurality of measurements and second plurality of measurements.

A further enhancement of the computer-implemented method may include, wherein calculating the enhanced geographic location measurements includes using, by the DI computing device, a Kalman filter.

A further enhancement of the computer-implemented method may include, wherein the telematics data includes an acceleration value, wherein calculating the enhanced geographic location measurement for a candidate geographic location measurement includes generating, by the DI computing device, an estimated geographic location measurement by integrating an acceleration value from a previous geographic location measurement over a period of time between the previous geographic location measurement and the candidate geographic location measurement and calculating, by the DI computing device, the enhanced geographic location measurement by calculating a weighted average between the candidate geographic location measurement and the estimated geographic location measurement.

A further enhancement of the computer-implemented method may include, wherein identifying the user device corresponding to the driver includes determining, by the DI computing device, based upon the predicted position, a first probability that the first user device corresponds to a driver of the vehicle for the trip and a second probability that the second user device corresponds to the driver and identifying, by the DI computing device, the driver user device based upon the first probability and the second probability.

A further enhancement of the computer-implemented method may include generating, by the DI computing device, a map including a position of the second user device with respect to the first user device based upon the predicted position.

A further enhancement of the computer-implemented method may include transmitting, by the DI computing device, a confirmation message to the identified driver user device, receiving, by the DI computing device, a response message from the driver user device including an indicator of whether the driver user device corresponds to the driver, and determining, by the DI computing device, whether the identified driver device corresponds to the driver based upon the driver response message.

A further enhancement of the computer-implemented method may include receiving, by the DI computing device, from a third user device, a third plurality of measurements periodically captured at the third user device during the trip, determining, by the DI computing device, based upon the third plurality of measurements, that the third user device is within the vehicle during the trip, calculating, by the DI computing device, a respective enhanced geographic location measurement for each of the third plurality of measurements based upon the third plurality of measurements, determining, by the DI computing device, based upon the enhanced geographic location measurements, a predicted position of the third user device relative to the first user device with respect to a forward direction of travel of the vehicle, and identifying, by the DI computing device, from among the first user device, the second user device, and the third user device, a driver user device corresponding to a driver based upon the predicted position of the second user device relative to the first user device.

In another aspect, at least one non-transitory computer-readable media having computer-executable instructions embodied thereon may be provided that, when executed by a driver identification (DI) computing device including at least one processor in communication with a memory device, cause the at least one processor to: (1) receive, from a first user device, a first plurality of measurements periodically captured at the first user device during a trip taken by a vehicle; (2) receive, from a second user device, a second plurality of measurements periodically captured at the second user device during the trip; (3) determine, based upon the first plurality of measurements and the second plurality of measurements, that the first user device and the second user device are within the vehicle during the trip; (4) calculate a respective enhanced geographic location measurement for each of the first plurality of measurements and each of the second plurality of measurements based upon the first plurality of measurements and the second plurality of measurements; (5) determine, based upon the enhanced geographic location measurements, a predicted position of the second user device relative to the first user device with respect to a forward direction of travel of the vehicle; and/or (6) identify, from among the first user device and the second user device, a driver user device corresponding to a driver based upon the predicted position of the second user device relative to the first user device. The computer-implemented instructions may direct additional, less, or alternate functionality, including that discussed elsewhere herein.

A further enhancement of the at least one non-transitory computer-readable media may include computer-executable instructions that A further enhancement of the at least one non-transitory computer-readable media may include computer-executable instructions, wherein each of the first plurality of measurements and each of the second plurality of measurements includes a measured geographic location, an error estimate, and telematics data corresponding to the measured geographic location.

A further enhancement of the at least one non-transitory computer-readable media may include computer-executable instructions that cause the at least one processor to calculate the enhanced geographic location measurements based upon the measured geographic location, the error estimate, and the telematics data corresponding to each of the first plurality of measurements and second plurality of measurements.

A further enhancement of the at least one non-transitory computer-readable media may include computer-executable instructions that cause the at least one processor to calculate the enhanced geographic location measurements using a Kalman filter.

A further enhancement of the at least one non-transitory computer-readable media may include computer-executable instructions that, wherein the telematics data includes an acceleration value, wherein to calculate the enhanced geographic location measurement for a candidate geographic location measurement, cause the at least one processor to generate an estimated geographic location measurement by integrating an acceleration value from a previous geographic location measurement over a period of time between the previous geographic location measurement and the candidate geographic location measurement and calculate the enhanced geographic location measurement by calculating a weighted average between the candidate geographic location measurement and the estimated geographic location measurement.

A further enhancement of the at least one non-transitory computer-readable media may include computer-executable instructions that, wherein to identify the user device corresponding to the driver, cause the at least one processor to determine, based upon the predicted position, a first probability that the first user device corresponds to a driver of the vehicle for the trip and a second probability that the second user device corresponds to the driver and identify the driver user device based upon the first probability and the second probability.

A further enhancement of the at least one non-transitory computer-readable media may include computer-executable instructions that cause the at least one processor to generate a map including a position of the second user device with respect to the first user device based upon the predicted position.

A further enhancement of the at least one non-transitory computer-readable media may include computer-executable instructions that cause the at least one processor to transmit a confirmation message to the identified driver user device, receive a response message from the driver user device including an indicator of whether the driver user device corresponds to the driver, and determine whether the identified driver device corresponds to the driver based upon the driver response message.

A further enhancement of the at least one non-transitory computer-readable media may include computer-executable instructions that cause the at least one processor to receive, from a third user device, a third plurality of measurements periodically captured at the third user device during the trip, determine, based upon the third plurality of measurements, that the third user device is within the vehicle during the trip, calculate a respective enhanced geographic location measurement for each of the third plurality of measurements based upon the third plurality of measurements, determine, based upon the enhanced geographic location measurements, a predicted position of the third user device relative to the first user device with respect to a forward direction of travel of the vehicle, and identify, from among the first user device, the second user device, and the third user device, a driver user device corresponding to a driver based upon the predicted position of the second user device relative to the first user device.

Examples of Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom).

The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

In some embodiments, registration of users for the DI system includes opt-in informed consent of users to data usage consistent with consumer protection laws and privacy regulations. In some embodiments, the collected data may be anonymized and/or aggregated prior to receipt such that no personally identifiable information (PII) is received. In other embodiments, the system may be configured to receive registration data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method to determine a device of a driver, comprising:
    receiving, by a computing device and from a first user device of a first user in a vehicle, first telematics data;

receiving, by the computing device and from a second user device of a second user in the vehicle, second telematics data;
    determining, using a trained machine learning model, patterns in the first and second telematics data;
    determining, using the patterns in the first and second telematics data, relative positions of the first user device and the second user device, comprising analyzing the first and second telematics data associated with a turn of the vehicle to identify that a first one of the first user device or the second user device experiences greater angular acceleration than a second one of the first user device or the second user device, indicating that the second one of the first user device or the second user device is positioned closer to a center of the turn, wherein respective acceleration data of the first and second telematics data is measured by respective accelerometers and gyroscopes onboard the first and second user devices, and wherein the respective acceleration data is used to determine a left-to-right positioning of the first user device relative to the second user device with respect to a direction of forward movement of the vehicle;
    determining, based on the relative positions of the first user device and the second user device, a predicted position of the first user device relative to the second user device; and
    identifying, by the computing device, that the first user or the second user is the driver of the vehicle based at least in part upon the predicted position of the first user device relative to the second user device.

2. The computer-implemented method of claim 1, wherein the first telematics data and the second telematics data comprise:
    vertical movement of the vehicle comprising a degree of incline or decline inside the vehicle, wherein the degree of incline or decline causes vertical acceleration in the first user device or the second user device.

3. The computer-implemented method of claim 1 further comprising:
    receiving, by the computing device and from the first user device, a first geographic location; and
    receiving, by the computing device and from the second user device, a second geographic location, wherein:
        at least one of the first geographic location or the second geographic location is displayed on a user interface as a radius around a portion of the first geographic location or the second geographic location; and
        the computer-implemented method further comprises:
            identifying, by the computing device, a location of the first user device or the second user device by estimating a probability that exceeds a threshold probability of the location being within the radius.

4. The computer-implemented method of claim 1, wherein using the trained machine learning model comprises utilizing deep learning algorithms and pattern recognition to detect the patterns in the first and second telematics data.

5. The computer-implemented method of claim 1 further comprising:
    determining, by using a reference user device or a map of relative locations of multiple user devices travelling together, a distance vector between the first user device and the second user device.

6. The computer-implemented method of claim 1 further comprising:

determining, by the computing device, a first probability that the first user device corresponds to the driver of the vehicle and a second probability that the second user device corresponds to the driver of the vehicle.

7. The computer-implemented method of claim 6 further comprising:

identifying, by the computing device, which of the first user device or the second user device corresponds to the driver based on the first probability and the second probability.

8. A system comprising one or more processors and one or more non-transitory computer-readable media storing computing instructions that, when executed on the one or more processors, cause the one or more processors to perform operations comprising:

receiving, by a computing device and from a first user device of a first user in a vehicle, first telematics data;

receiving, by the computing device and from a second user device of a second user in the vehicle, second telematics data;

determining, using a trained machine learning model, patterns in the first and second telematics data;

determining, using the patterns in the first and second telematics data, relative positions of the first user device and the second user device, comprising analyzing the first and second telematics data associated with a turn of the vehicle to identify that a first one of the first user device or the second user device experiences greater angular acceleration than a second one of the first user device or the second user device, indicating that the second one of the first user device or the second user device is positioned closer to a center of the turn, wherein respective acceleration data of the first and second telematics data is measured by respective accelerometers and gyroscopes onboard the first and second user devices, and wherein the respective acceleration data is used to determine a left-to-right positioning of the first user device relative to the second user device with respect to a direction of forward movement of the vehicle;

determining, based on the relative positions of the first user device and the second user device, a predicted position of the first user device relative to the second user device; and identifying, by the computing device, that the first user or the second user is a driver of the vehicle based at least in part upon the predicted position of the first user device relative to the second user device.

9. The system of claim 8, wherein the first telematics data and the second telematics data comprise vertical movement of the vehicle comprising a degree of incline or decline inside the vehicle, wherein the degree of incline or decline causes vertical acceleration in the first user device or the second user device.

10. The system of claim 8, wherein the operations further comprise:

receiving, by the computing device and from the first user device, a first geographic location; and receiving, by the computing device and from the second user device, a second geographic location, wherein:

at least one of the first geographic location or the second geographic location is displayed on a user interface as a radius around a portion of the first geographic location or the second geographic location; and the operations further comprise:

identifying, by the computing device, a location of the first user device or the second user device by estimating a probability that exceeds a threshold probability of the location being within the radius.

11. The system of claim 8, wherein using the trained machine learning model comprises utilizing deep learning algorithms and pattern recognition to detect the patterns in the first and second telematics data.

12. The system of claim 8, wherein the operations further comprise:

determining, by using a reference user device or a map of relative locations of multiple user devices travelling together, a distance vector between the first user device and the second user device.

13. The system of claim 8, wherein the operations further comprise:

determining, by the computing device, a first probability that the first user device corresponds to the driver of the vehicle and a second probability that the second user device corresponds to the driver of the vehicle.

14. The system of claim 13, wherein the operations further comprise:

identifying, by the computing device, the device corresponding to the driver based on the first probability and the second probability.

15. One or more non-transitory computer-readable media storing computing instructions that, when executed by one or more processors, cause the one or more processors to perform operations comprising:

receiving, by a computing device and from a first user device of a first user in a vehicle, first telematics data;

receiving, by the computing device and from a second user device of a second user in the vehicle, second telematics data;

determining, using a trained machine learning model, patterns in the first and second telematics data;

determining, using the patterns in the first and second telematics data, relative positions of the first user device and the second user device, comprising analyzing the first and second telematics data associated with a turn of the vehicle to identify that a first one of the first user device or the second user device experiences greater angular acceleration than a second one of the first user device or the second user device, indicating that the second one of the first user device or the second user device is positioned closer to a center of the turn, wherein respective acceleration data of the first and second telematics data is measured by respective accelerometers and gyroscopes onboard the first and second user devices, and wherein the respective acceleration data is used to determine a left-to-right positioning of the first user device relative to the second user device with respect to a direction of forward movement of the vehicle;

determining, based on the relative positions of the first user device and the second user device, a predicted position of the first user device relative to the second user device; and identifying, by the computing device, that the first user or the second user is a driver of the vehicle based at least in part upon the predicted position of the first user device relative to the second user device.

16. The one or more non-transitory computer-readable media of claim 15, wherein the first telematics data and the second telematics data comprise vertical movement of the vehicle comprising a degree of incline or decline inside the vehicle, wherein the degree of incline or decline causes vertical acceleration in the first user device or the second user device.

17. The one or more non-transitory computer-readable media of claim 15, wherein the operations further comprise:

receiving, by the computing device and from the first user device, a first geographic location; and receiving, by the computing device and from the second user device, a second geographic location, wherein:

at least one of the first geographic location or the second geographic location is displayed on a user interface as a radius around a portion of the first geographic location or the second geographic location; and the operations further comprise:

identifying, by the computing device, a location of the first user device or the second user device by estimating a probability that exceeds a threshold probability of the location being within the radius.

18. The one or more non-transitory computer-readable media of claim 15, wherein using the trained machine learning model comprises utilizing deep learning algorithms and pattern recognition to detect the patterns in the first and second telematics data.

19. The one or more non-transitory computer-readable media of claim 15, wherein the operations further comprise:

determining, by using a reference user device or a map of relative locations of multiple user devices travelling together, a distance vector between the first user device and the second user device.

20. The one or more non-transitory computer-readable media of claim 15, wherein the operations further comprise:

determining, by the computing device, a first probability that the first user device corresponds to the driver of the vehicle and a second probability that the second user device corresponds to the driver of the vehicle; or identifying, by the computing device, the device corresponding to the driver based on the first probability and the second probability.

* * * * *